Sept. 20, 1938.  W. A. TOLSON  2,130,912
DIRECTION FINDER
Filed Oct. 30, 1934   3 Sheets-Sheet 3

INVENTOR:
William A. Tolson,
BY D. R. Goldsborough
ATTORNEY.

Patented Sept. 20, 1938

2,130,912

UNITED STATES PATENT OFFICE 2,130,912

DIRECTION FINDER

William A. Tolson, Westmont, N. J., assignor, by mesne assignments, to Radio Corporation of America, New York, N. Y., a corporation of Delaware Application October 30, 1934, Serial No. 750,631

6 Claims. (Cl. 250—11)

This invention relates to direction finders, including earth inductor compasses, radio beacons, and the like. It has particular utility in marine and aerial navigation, since it can be constructed in a form which is both light and compact and it possesses a high degree of sensitivity.

It is known that an indication of direction may be provided in one instrument somewhat remotely situated with respect to a rotating coil within which currents may be induced solely from the directional effect of the earth's magnetism. Such a device as heretofore used has usually involved a matter of commutation in order to provide a direct current to be impressed upon the sensitive element of the indicator.

When an earth inductor compass is used in an airplane it has been found desirable to locate the inductor rotor as far as possible from the airplane motor. The object is to provide a field for the inductor rotor in which the lines of force of the earth's magnetism shall be freed to the utmost from the influence of stray fields in the neighborhood of the airplane motor. Due to the fact that commutation has usually been provided in connection with the inductor rotor, it has been necessary to provide a long rigid connection between the brush rotating gear and the navigator's position so that the pointer of the indicator instrument might be adjusted to a desired setting with respect to the intended course of the ship.

The indicating instrument heretofore provided in connection with an earth inductor compass, according to the teachings of the prior art, has been required to respond to energy supplied by the inductor rotor without amplification, since it is not practicable to amplify a continuous direct current. Under these conditions it has been found that small errors in commutation are apt to produce serious errors of indication.

It is among the objects of my invention to provide apparatus of the character described which does not involve the defects of design and difficulties of operation above recounted.

A further object of my invention is to provide direction finding apparatus operating in a magnetic field in such a manner that the induced currents may be amplified and impressed upon a highly sensitive instrument so as to give a reliable indication of direction.

Figure 1:
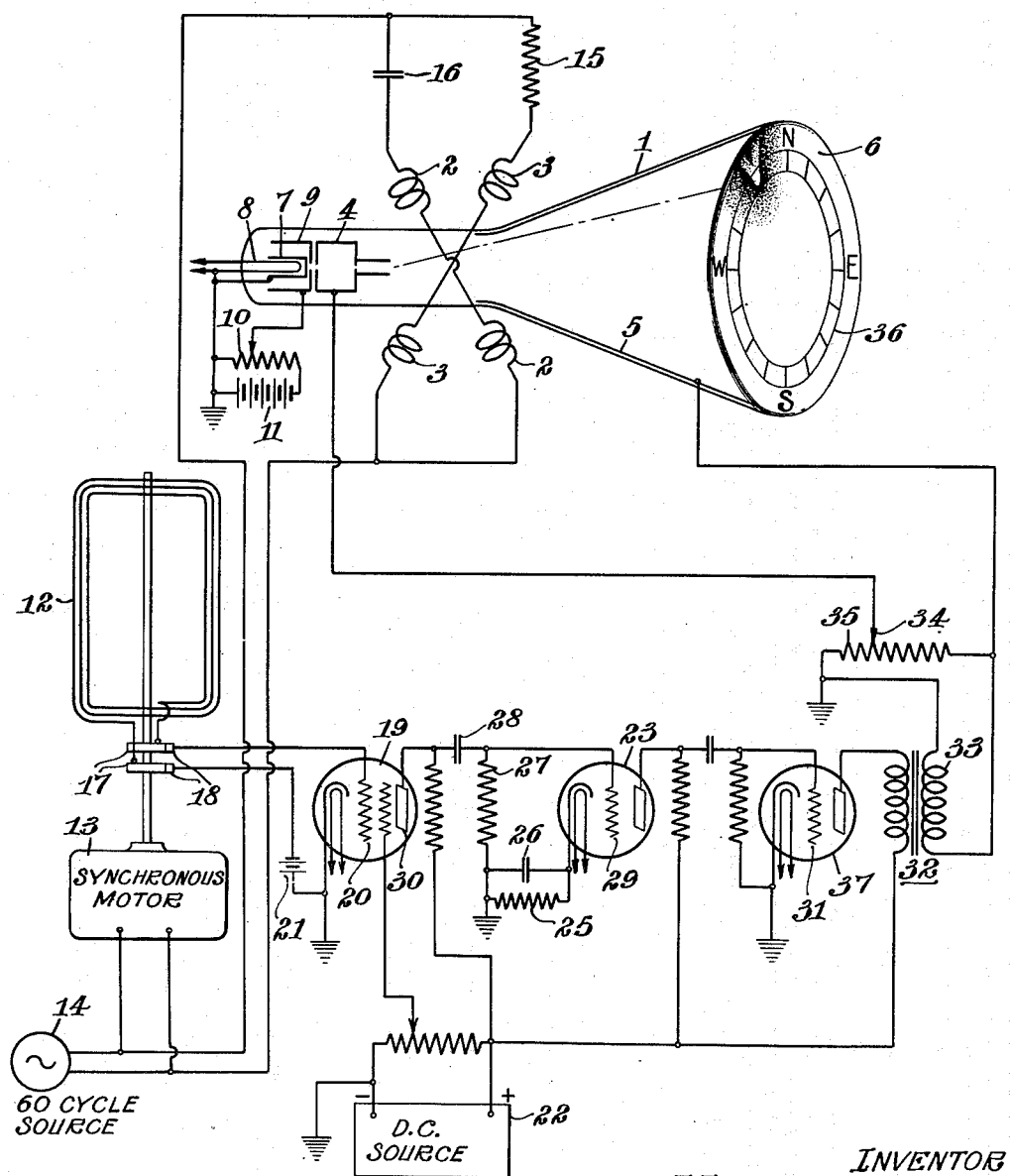
Figure 2:
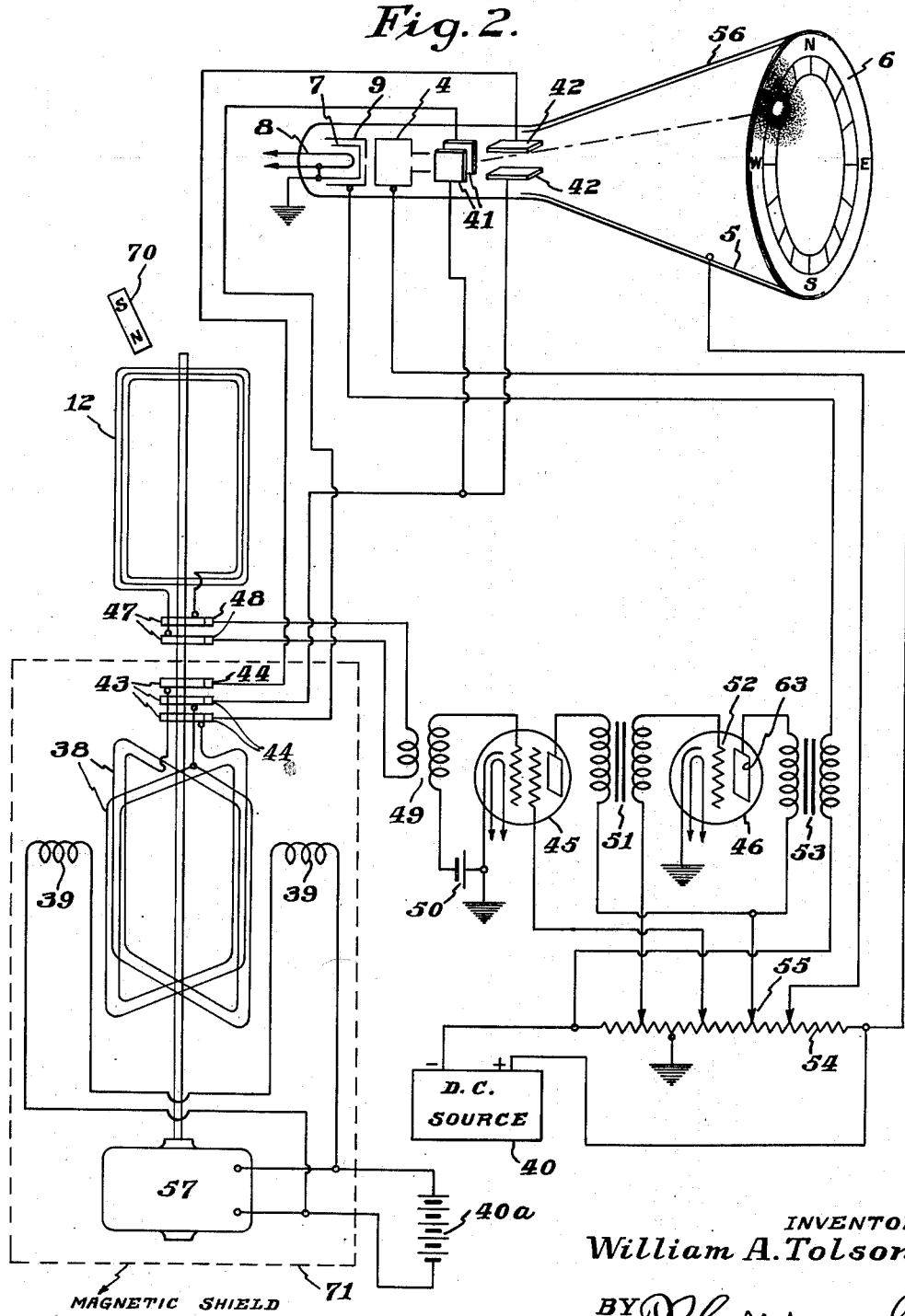
Figure 3:
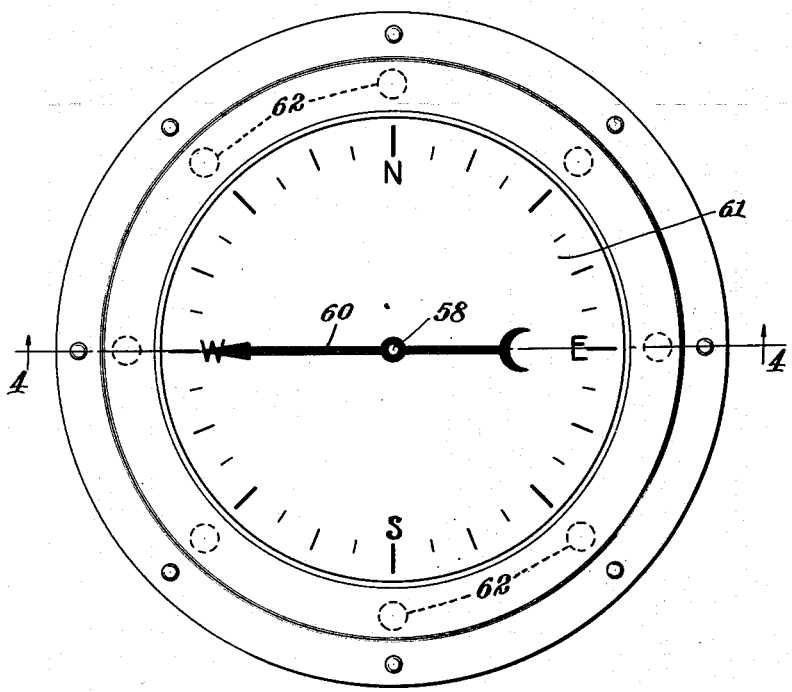
Figure 4:
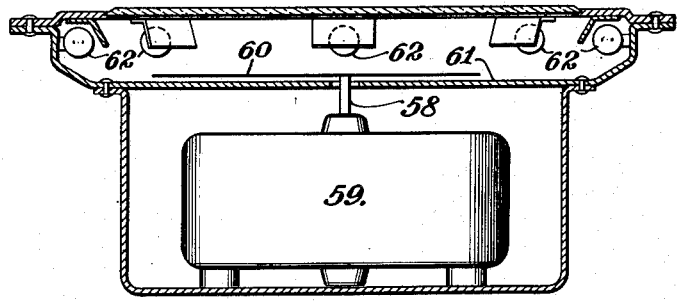

Still further objects and advantages of my invention will become apparent upon reading the following detailed description in connection with the accompanying drawings, in which Figure 1 is a diagrammatic showing of one embodiment comprising among other apparatus a cathode ray tube as an indicator, Fig. 2 shows diagrammatically a modified arrangement including also the use of a cathode ray tube, Fig. 3 is a front view of an indicating instrument which may be used in place of the cathode ray tube, and Fig. 4 is a cross-sectional elevation of the instrument shown in Fig. 3 taken along the line 4—4.

Certain features of the embodiment shown in Fig. 1 constitute an invention of M. A. McLennan, disclosed in copending application Serial No. 750,053 filed October 26, 1934 and entitled Indicator.

Referring to Fig. 1, I show the cathode ray tube 1 having magnetic deflecting coils 2 and 3 and having a focusing anode 4 as well as an accelerating anode 5. The screen end 6 is coated internally with a suitable fluorescent material. The tube is also provided with the usual cathode 7, which may, if desired, be indirectly heated as by means of the filament 8. The control electrode 9 is not in all cases essential, but it has been shown for convenience in regulating the intensity of the light spot to be formed on the fluorescent screen through the action of the focused electron beam. If a control electrode 9 is provided, it may be suitably biased as by means of a connection thereto from the potentiometer 10 disposed across the terminals of a battery 11 or other source of potential. Connections are made, as shown, with the grounded cathode 7.

The anodes of the cathode ray tube may, if desired, be excited momentarily, according to the invention of M. A. McLennan, hereinbefore mentioned. According to my invention the source of excitation comprises an alternating current generator, including a coil 12 which is rotated in the earth's magnetic field. The rotation may be produced as by means of a small synchronous motor 13, the power for which may be derived from any suitable alternating current source such as that shown at 14. This latter source may also be used, if desired, for exciting the deflecting circuits which are herein represented by magnetic coils 2 and 3. It is necessary that the rotating field produced by the deflecting circuits should be kept in synchronism (though it varies in phase) with respect to the alternating current generated by the coil 12. The phase variation results from any variable orientation of the field of the synchronous motor 13, such as produced when changing the course of the vessel on which the compass is carried. Furthermore, it is apparent that the coil 12 will generate one cycle of current during one revolution, and that during the same time the deflecting circuits 2—2 and 3—3 will produce substantially one revolution of the magnetic field for controlling the direction of the electron beam in the cathode ray tube.

In order to provide a 90° phase displacement between the current in coils 2 in reference to the current in coils 3, I introduce in the deflecting circuits in the one case a suitable resistor 15 and in the other case a capacitor 16. The resistive and capacitive values respectively are so chosen as to produce the desired 90° phase displacement. If a two-phase source of alternating current were available, it could, of course, be applied to the coils 2 and 3 in an obvious manner.

Because the synchronous motor 13 and the deflecting coils 2 and 3 are operated from a common source 14, it will be clear that synchronism is automatically maintained between the deflecting circuits and the rotations of the inductor coil 12. If the apparatus is carried on a moving vessel, or on aircraft, then it is possible to make use of the phase coordination between the coil 12 and the deflecting circuits and thereby to indicate the direction in which the vessel or aircraft may be headed.

The earth's magnetism induces a small alternating current in the coil 12, the frequency of the current being dependent upon the speed of rotation of the coil. One complete revolution of the coil generates one complete cycle of alternating current. By means of collector rings 17 and brushes 18 this current may be taken off and applied, say, across the grid and cathode leads of an amplifier tube 19. The grid 20 may, if desired, be suitably biased by means of the battery 21. Anode and screen grid potentials may be supplied from the source 22. The amplifier tube 19 may then be caused to function in the usual manner. More than one stage of amplification may be provided, if desired.

The intercoupling between stages may be either by means of transformers or by the usual form of resistance coupling, as is well known in the art. In this instance I have illustrated a suitable network comprising the electron tubes 19, 23 and 37, each of which serves a different purpose. The tube 23 normally draws very little current. One way of producing this result is to introduce between the cathode 24 and ground a high resistor 25, say, of the order of one megohm. This resistor is preferably shunted by a capacitor 26 permitting momentary currents of larger amplitude to flow. The grid circuit includes a resistor 27 and is coupled by means of a capacitor 28 to the output circuit of the tube 19.

The tube 19 provides substantially linear amplification of a sine wave current. When a maximum voltage is developed on the anode 30 a positive wave peak will then be applied across the capacitor 28 to the grid 29 which raises its potential just above the cut-off point due to the fact that this grid is normally very negatively biased by the resistors 25 and 27. A very sharply peaked impulse is, therefore, transmitted by the tube 23, this impulse being developed into a space current of suitable amplitude (aided by the low impedance of the capacitor 26) for suddenly lowering the plate potential and biasing the grid 31 of the tube 37 below its cut-off point.

Normally, the grid 31 may be so biased that a current of suitable amplitude will flow in the tube 37, thereby developing a more or less saturated magnetic flux in the core of the transformer 32. If the tube 37 becomes suddenly blocked, as when its grid momentarily goes negative, it will be seen that the stored energy in the transformer 32 must be dissipated through its secondary winding 33. It is possible in this manner to develop a very high potential such as is suitable for impression upon the anodes of a cathode ray tube. As a means to this end I have indicated the secondary winding 33 having one terminal thereof connected to ground and the other terminal connected to the accelerating anode 5. A lesser potential may be applied to the focusing anode 4 through a circuit which includes a tap 34 on the potentiometer 35, the latter being disposed across the terminals of the secondary winding 33.

In the operation of my invention the original sine wave generated by the coil 12 is translated by the tube 23 into discreet impulses which may be made steep-sided and of very short duration. It is only when these impulses occur that voltages will be developed on the anode of the cathode ray tube. Hence it is possible to very sharply define the position of a luminous spot to be displayed on the fluorescent screen 6. While the deflecting circuits 2 and 3 may be functioning continuously, there is no electron beam to be projected upon the screen 6 until impulses are impressed upon the anodes 4 and 5. It is found, however, that the action of the focusing and accelerating anodes brings the light spot to its position of maximum intensity somewhere along the arc of a circle. This circle is preferably concentric with the screen 6 and conveniently near the periphery thereof. The spot seems to develop gradually along an arcuate path starting from the edge of the screen. When the peak of the impulse passes, the spot fades out as it departs from the point of focus along another arcuate path toward the edge of the screen. The converging of these paths of approach and departure provides a desirable pattern for the image of the light spot, in that the point of convergence is very clearly defined. The angle subtended between the paths of approach and departure may be made quite sharp, if so desired, by merely providing suitable electrical constants in the design of the transformer 32.

A suitable scale 36 may be printed on the glass of the screen so as to provide reference markings for any desired indication, whether the device is used as a compass, as a radio beacon, or merely for indicating phase angles between two alternating currents.

In the embodiment of my invention as shown, it is apparent that the directional effect of the earth's mangetism produces an alternating current in the rotating coil 12 and the peaks of this current of one polarity are amplified and translated into voltage impulses of considerable magnitude to be applied to the anodes of the cathode ray tube. The synchronous motor 13 is of that type wherein its armature makes one revolution during a single cycle of current from the source 14. Since the mounting of the entire apparatus may be fixed in relation to the aircraft or vessel in which it is carried, and since the phase angle between the source of alternating current 14 and the alternating current generated in the coil 12 will vary with the orientation of the vessel, it is clear that the light spot appearing on the screen of the cathode ray tube will also be varied in its position on the circular scale. Thus the direction in which the vessel is headed may be indicated.

Referring to Fig. 2, I show a modification which has utility in certain instances where there is no available alternating current power supply such as one of a 60-cycle frequency. In such cases it is necessary to provide a suitable source of alternating current to be used in a timing circuit and to be kept in synchronism, though not in phase, with the alternating current generated by the earth inductor coil. For purposes of illustration, I have shown how the deflecting circuits of the cathode ray tube 56 may be excited from two separate armature windings 38 mounted on the same shaft with the earth inductor coil 12. These armature windings 38 are disposed at right angles to one another in order that the currents separately generated may be in 90° phase relation to one another. As shown in the figure, they rotate in a field produced by the coils 39 which may be energized from any suitable direct current source such as 40a. One of the deflecting circuits may include the electrostatic plates 41 and the other of the deflecting circuits may include the electrostatic plates 42. Connections from the coils 38 to the electrostatic plates are made through the collector rings 43 and brushes 44. In place of the electrostatic plates, magnetic coils 2 and 3 may be used as shown in Fig. 1. In either case horizontal and vertical deflection of the electron beam in the cathode ray tube 56 is provided. Since sine waves are produced on the deflecting circuits in 90° phase relation to one another, it is apparent that a rotating field will be produced in the cathode ray tube, and the electron beam when subjected to this rotating field will then describe a circle on the fluorescent screen 6, provided that the other electrodes of the tube have suitable potentials impressed thereon so that the beam may be focused and the electrons accelerated sufficiently to reach the screen.

I may, if desired, employ an amplifier and wave shaping network comprising any suitable number of electron discharge tubes. For the sake of simplicity, however, I have shown in Fig. 2 an amplifier tube 45 and a wave shaping or limiting tube 46. The current induced in the coil 12 by the earth's magnetism may be taken off through the collector rings 47 and brushes 48 and applied across the primary of a transformer 49. The secondary of transformer 49 is included in the input circuit for the tube 45. The grid of this tube may be suitably biased by means of the battery 50 so as to provide linear amplification of the sine wave which is generated by the coil 12. Thus an amplified space current through the tube 45 may be obtained in the well known manner. This current when impressed across the primary of a transformer 51 will induce in its secondary a voltage suitable for impression upon the grid 52 of the tube 46. This grid, however, is preferably so negatively biased that only peaks of one polarity will raise the grid potential above the cut-off point. In this manner an impulse of very short duration will be produced in the output circuit of the tube 46. This impulse when impressed across the primary of a transformer 53 may be utilized in a circuit including the secondary thereof and the control grid 9 of the cathode ray tube 56. This control grid is normally biased below the cut-off point so that when it receives the clipped impulses it will go sufficiently less negative to release a volley of electrons for impact against the fluorescent screen 6 at a point determined by the time relation between this impact and the phasing of the deflecting circuits.

In order that all the necessary potentials for operating the tubes 45, 46 and 56 may be provided from a common direct current source 40, I may, if desired, employ a potentiometer 54 having various taps, as is usual, with connections therefrom to the different electrodes of these tubes. Thus it is possible to obtain all the necessary anode and screen grid voltages as well as bias potentials for the control grids.

In the operation of the system shown in Fig. 2, it will be seen that the direction of the field produced by the coils 39 remains fixed with respect to the axis of the vessel on which the apparatus is carried, whereas the field produced by the earth's magnetism in the coil 12 is of fixed direction. The angular displacement of one field with respect to the other thus determines the phase relation between the directive force of the deflecting circuits and the moment of release of electrons for illuminating a spot on the screen 6. The position of this spot therefore shows the direction in which the vessel is headed.

It is customary to provide some means of compensation for magnetic compasses. A ship's compass is therefore usually provided with adjustable permanent magnets suitably disposed in the housing which contains the compass needle. I have not shown any housing for my earth inductor rotor, but I have indicated diagrammatically that a permanent magnet 70 may be provided and may be adjustably positioned wherever it is necessary to compensate for aberrations of the earth's field due to the presence of magnetic material on board the airship, or other vessel, on which the compass is to be carried. I provide further a magnetic shield 71 for housing the motor 57 and the generator unit including the coils 38 and 39 by which the deflecting circuits of the cathode ray tube 56 are controlled. This shield 71 therefore prevents any disturbance due to the operation of the magnetic apparatus contained therewithin from influencing the earth's field in which the coil 12 rotates.

The points of the compass may be inscribed on the fluorescent screen 6 of the cathode ray tube 56 in the manner shown, if the instrument is to be used according to one method of navigation. Otherwise the east and west points may be reversed, as is usually the case with mariners' compasses, so that as the ship's course is changed the luminous spot on the screen will move counter to the direction in which the ship swerves. This latter mode of operation may be preferable to the navigator who is accustomed to it, because no other method is possible when using an ordinary magnetic needle compass. In my apparatus, however, it is possible to reverse the connections to one of the coils 38 so as to reverse the rotational effect of the deflecting circuits and thereby to cause the luminous spot to move, say, more easterly from a northerly indication when the ship's course is made more easterly. In this manner the true direction taken by the ship may at all times be positively indicated.

Referring to Fig. 3, I show a modification of indicating apparatus which, because of its light and compact construction, may be found preferable to the use of a cathode ray tube. The circuits involved in operating this instrument may be the same as those shown in either Fig. 1 or Fig. 2. The indicating needle 60 and its shaft 58 may be continuously and rapidly rotated by means of a small synchronous motor 59, assuming that an external alternating current source such as 14 in Fig. 1 is provided. If, however, no such source is available, the motor would be operated from energy supplied by coils such as 38 in Fig. 2. In this case, however, the coils may be arranged to produce either single-phase or two-phase currents, and the motor 59 would be wound accordingly for single-phase or two-phase synchronous operation.

The indicating needle 60 is intended to be rotated with such rapidity that in ordinary light the eye could not follow it. The instrument dial 61 is, therefore, preferably shaded from ordinary light and is illuminated only momentarily by an arrangement of small gas-filled lamps 62 disposed around the periphery. These lamps may be connected in circuit with the anode 63 of the tube 46 as shown in Fig. 2, or otherwise they may be in circuit with the secondary of either of the transformers 32 or 53. Thus, when an impulse is derived from the operation of the wave-shaping tube (either 37 or 46, as the case may be) the lamps 62 will be ignited but for only so short a period as to illuminate the dial 61 and the pointer 60 and cause the latter to appear at rest in whatever position it happens at the moment to be. The time relation between the moment of excitation of the lamps 62 and the angular position of the pointer 60 as controlled by the synchronous motor 59 gives a true indication of direction. This is in accordance with the stroboscopic effect to be expected of such a device.

Any suitable means, not shown, may be provided for properly "phasing in" the pointer 60 when either the motor 13 or the motor 57 is started. After that, the phase angle will be automatically maintained so long as the apparatus is kept in continuous operation.

Although I have described herein certain specific means for accomplishing the objects of my invention, these are given merely by way of example and are not to be considered limitations to the scope of my invention. It will be apparent to those skilled in the art that my apparatus may be used advantageously in connection with the reception of radio signals for direction finders. The inductor loop 12 will be recognized as the full equivalent of a directional loop for the reception of radio signals. Other applications of my invention will also suggest themselves to those skilled in the art. My invention, therefore, is not to be limited except insofar as is necessitated by the prior art and by the spirit of the appended claims.

I claim as my invention:

1. In radio receiving apparatus the combination of a loop antenna, means for rotating said loop antenna, a cathode ray tube, means for generating a rotating field as said loop antenna is rotated, means for controlling the beam of said cathode ray tube in accordance with said rotating field and means for modulating said beam in accordance with signaling energy received over said loop antenna.

2. In radio receiving apparatus the combination of a loop antenna, means for rotating said loop antenna, a cathode ray tube having means for exhibiting the effects of the cathode ray and means for moving the cathode ray over a predetermined path, means for generating a pulsating electric current for energizing said means for moving the cathode ray, means for operating said generating means in synchronism with said loop rotating means and means for modulating said cathode ray in accordance with signal energy received over said loop.

3. In radio receiving apparatus the combination of a loop antenna, means for rotating said loop antenna, a cathode ray tube having a screen for exhibiting the effects of the cathode ray and means for moving the cathode ray over a substantially circular predetermined path on said screen, means for generating a pulsating electric current for energizing said means for moving the cathode ray, means for operating said generating means in synchronism with said loop rotating means and means for controlling said cathode ray in accordance with signal energy received over said loop.

4. In radio receiving apparatus the combination of a loop antenna, a shaft for said loop, means connected to said shaft for rotating said loop antenna, a cathode ray tube, a generator connected to said shaft for generating a rotating electric field as said loop antenna is rotated, means for controlling the beam of said cathode ray tube in accordance with said rotating field and in accordance with signaling energy received over said loop.

5. In radio receiving apparatus the combination of a rotatable device for receiving signaling energy from different directions, means for rotating said rotatable device, a cathode ray tube, means for generating a rotating field in predetermined time relation with the rotation of said rotatable device, means for controlling the beam of said cathode ray tube in accordance with said rotating field and in accordance with signaling energy received from said device.

6. In a radio receiving apparatus the combination of an antenna, means for varying the directivity of reception of said antenna, a cathode ray tube, means for generating a rotating field in synchronism with said variations in directivity, means for controlling the beam of said cathode ray tube in accordance with said rotating field, and means for modulating said beam in accordance with signaling energy received over said antenna.

WILLIAM A. TOLSON.